United States Patent Office 3,309,204
Patented Mar. 14, 1967

3,309,204
METHOD OF PREPARING A STABLE
SAUSAGE EMULSION
Richard L. Helmer and William L. Brown, Ottumwa, Iowa, assignors to John Morrell & Co., Ottumwa, Iowa, a corporation of Maine
No Drawing. Filed Feb. 14, 1964, Ser. No. 344,840
6 Claims. (Cl. 99—109)

This invention relates to a stable sausage composition; more particularly, it relates to the incorporation of a vegetable oil into the sausage composition so as to greatly increase the sausage emulsion stability.

The great quantity of sausage consumed each year is an indication of its extreme importance in the meat industry. One of the chief problems growing out of the production of such products is "emulsion breakdown." This occurs when fat renders from the product during processing and works out to form a little cap of fat ("fat caps") at the top of the product. Generally, this is more prevalent in the production of frankfurters but the same problem is found in other areas of sausage production. The "fat cap" contributes to poor machine operation; thereby requiring extra handling and, in some cases, reworking of the product so as to reduce and/or remove this objectionable characteristic. By increasing the stability of the sausage emulsion it is possible to produce a significantly higher quality product at a lower cost.

An emulsion is a two-phase system wherein one liquid, which is not miscible with a second liquid, is dispersed in the second liquid. There is an old proverb which states, "water and oil will not mix." This statement is true because of the inherent characteristics of the materials themselves. However, when oil and water are mixed with an emulsifier, such as protein, the mixture takes the physical form of an emulsion; thus affording the basis for the sausage emulsion production procedures.

Oil is considered to be a non-polar compound whereas water is known to be polar in nature. The emulsifier, or protein as the case may be in the sausage emulsions, contains both polar and non-polar moieties in its structural make-up; accordingly, to form the emulsion, the emulsifier (protein) attaches the polar moiety of itself to the water, and the non-polar moiety to the oil. In the case of a sausage or frankfurter emulsion, a stable emulsion is formed where fat globules are surrounded by the protein emulsifier, which, in turn, is dispersed in the continuous phase.

In the preparation of a sausage emulsion, the protein and the water of the meat mixture form a matrix that encapsulates the fat material. The discontinuous phase (fat) must be held within certain limits with respect to the continuous phase (water and protein) if the sausage emulsion is to maintain its stability. Due to the great importance of emulsion stability in sausage preparations, much study has been made by the industry in this area, and many methods and suggestions to that end have been proposed.

The instant invention is directed toward the production of a stable sausage emulsion and, accordingly, the primary object of the present invention is the production of such a product.

Another object of the present invention is to produce a sausage composition yielding superior products.

Another object of the present invention is the production of a superior frankfurter of high quality characterized by the lack of objectionable surface grease.

Still another object is to achieve a mixture of animal and vegetable fats in frankfurters.

Still another object is to achieve a stable sausage emulsion having a higher finished fat content.

Further objects and advantages of the invention will become apparent from the following discussion, and from the following description of the preferred forms of the invention.

The improved products of the present invention are obtained by incorporating 3–30% of a vegetable oil into a sausage composition. While this broad range is noted as being efficacious, the preferred embodiment of the present invention is the incorporation of about 10% of a vegetable oil into the sausage mixture whereby a stable sausage emulsion is obtained which, during further processing, does not give rise to the undesirable characteristics of the previously known emulsions. In particular, the incorporation of the specified amount of vegetable oil into the sausage composition alleviates the problems of the formation of "fat caps" and the accumulation of surface grease caused by emulsion breakdown.

The vegetable oil when incorporated within the mixture acts as a lubricant and prevents the emulsion from breaking down. The use of vegetable oil permits the formation of a more fluid emulsion having reduced viscosity. Animal oils, on the other hand, do not give these desirable results as, through utilization thereof, there is obtained a more viscous, less fluid emulsion which is not susceptible of efficient processing; and consequently a lower quality sausage product is obtained.

The preparation of stable sausage emulsions is described in the following examples.

GENERAL PROCEDURE

The meats were all ground separately once, through a 3 mm. diameter grinding plate, prior to formulation. The lean meats consisted of pork cheeks, short plates and mutton. They were placed in a silent chopper, along with water (in the form of ice) and seasoning (except iso-ascorbate) and chopped until a temperature of 32° F. was reached. The fat ingredients, consisting of head skin trimmings, partially defatted pork fatty tissue, pork stomach; and vegetable oil were then added. Approximately 30 seconds before removing the emulsion from the chopper, the iso-ascorbate was added. After reaching an emulsion temperature of 45° F. the chopping was stopped and the emulsion run through a mince master, using a fine plate.

The sausage emulsions so produced were tested for stability by the Armour Stability test, through the use of microscopic slide investigation, and by actual visual inspection of the finished product. It has been shown that the stability test run in the laboratory is a very reliable method of determining emulsion stability. The test measures the amount of water and fat accumulated in a test tube during a heating process. The emulsion is stuffed into a glass test tube, heated, and poured into a graduated cylinder; and measured for fat content and water content. From past results it appears that fat accumulation of 0.5 ml. and water accumulation of 1.5 ml. or less indicates a stable product. Fat accumulation between 0.5 ml. and 1.0 ml. and water accumulation between 1.5 ml. and 3.0 ml. have borderline stabilities. Any amount of fat accumulation above 1.0 ml. and water accumulation above 3.0 ml. generally indicates emulsion breakdown.

Additionally, it will be noted that in the following examples there is an analysis term called "added water." The percentage of "added water" is determined from calculations based on the protein content of the finished sausage. The M.I.D. formula for determinations of added moisture is predicated on the assumption that the average moisture content of meat amounts to slightly less than 4 times the percentage of protein in the meat. Under Meat Institute Determination regulations, 10% of added water is permitted in uncooked and smoked sausage.

Example 1

The following materials were mixed as per the procedure noted above:

| | Grams |
|---|---|
| Pork cheeks | 6,810 |
| Head skin trimmings | 2,270 |
| Partially defatted pork fatty tissue | 3,405 |
| Pork stomach | 5,675 |
| Short plates | 2,270 |
| Mutton | 2,270 |
| Water (ice) | 5,085 |
| Seasoning and spices | 3,127 |

Two batches of the above were made: (A) comprised the formula mentioned above, while (B) contained the above formula plus 20% soya oil.

The following tests were conducted upon each material—

(I) Stability test:
  (A) Control batch
    Water=3.40 ml.
    Fat=0.22 ml.
  (B) Control batch plus 20% soya oil
    Water=1.50 ml.
    Fat=0.20 ml.

(II) Analysis:

| | A, Percent | B, Percent |
|---|---|---|
| Moisture | 54.0 | 46.4 |
| Fat | 23.5 | 32.1 |
| Total Protein | 15.0 | 14.0 |
| Meat Protein | 13.7 | 12.7 |
| Added water | −0.8 | −4.4 |

(III) Results:
  (A) The product rendered—the frankfurters contained fat caps which, as noted above, is an indication of emulsion breakdown.
  (B) The product was stable even with the increased fat content.

Example 2

Formula:

| | Grams |
|---|---|
| Cow meat | 3,405 |
| Navel ends | 7,264 |
| Beef cheek meat | 2,814 |
| Jowls | 2,406 |
| Head skin trimmings | 3,405 |
| Partially defatted chopped pork | 3,405 |
| Seasoning and spices | 1,299 |
| Water | 6,810 |
| Soya oil (30%) | 6,810 |

(I) Analysis:

| | Percent |
|---|---|
| Moisture | 42.2 |
| Protein | 9.5 |
| Fat | 43.0 |
| Added water | +4.2 |

(II) Result:
A good stable frankfurter was produced which was light in color and had a spongy texture.

Example 3

Formula:

| | Grams |
|---|---|
| Pork tripe | 6,810 |
| Pork snouts | 4,540 |
| Navel ends | 2,270 |
| Head skin trimmings | 2,270 |
| Partially defatted pork fatty tissue | 2,270 |
| Beef cheeks | 2,270 |
| Water | 5,584 |
| Soya oil (10%) | 2,270 |
| Seasoning and spices | 3,127 |

(I) Stability test:
  Water=5.50 ml.
  Fat=0.20 ml.

(II) Analysis:

| | Percent |
|---|---|
| Moisture | 47.8 |
| Fat | 32.3 |
| Total protein | 13.7 |
| Meat protein | 12.4 |
| Added water | −1.8 |

(III) Result:
The product so produced was stable, had good peelability, and excellent color, taste, and texture.

Example 4

Formula:

| | Grams |
|---|---|
| Pork hearts | 12,485 |
| Pork stomach | 6,810 |
| Partially defatted pork fatty tissue | 3,405 |
| Seasoning and spices | 3,127 |
| Soya oil (20%) | 4,540 |
| Water | 5,085 |

(I) Analysis:

| | Percent |
|---|---|
| Moisture | 58.6 |
| Total protein | 12.7 |
| Meat protein | 11.4 |
| Fat | 21.2 |
| Added water | 13.0 |

(II) Result:
The frankfurter was stable even with the extremely poor formula. It was light in color and very tender.

At this point, it should be noted that Examples 2–4 clearly indicate that the meat ingredients can be changed without affecting the finished product.

Example 5

Formula:

| | Grams |
|---|---|
| Partially defatted chopped pork | 930 |
| Pork stomach | 4,540 |
| Head skin trimmings | 5,956 |
| Pork cheek | 4,540 |
| Beef cheek meat | 2,200 |
| Mutton | 4,540 |
| Water | 5,085 |
| Seasoning and spices | 3,127 |

Three batches of the above noted formula were prepared: (A) comprised the control batch without oil; (B) comprised the control batch plus 1% oil; and (C) comprised the control batch plus 5% oil.

(I) Stability test:
  (A) Water=4.70 ml.  Fat=0.38 ml.
  (B) Water=5.40 ml.  Fat=0.20 ml.
  (C) Water=5.50 ml.  Fat=0.16 ml.

(II) Analysis:

| | A, Percent | B, Percent | C, Percent |
|---|---|---|---|
| Moisture | 56.2 | 55.8 | 52.8 |
| Fat | 22.3 | 23.0 | 26.1 |
| Total protein | 14.0 | 13.7 | 13.6 |
| Meat protein | 12.7 | 12.4 | 12.3 |
| Added water | +5.4 | +6.2 | +3.6 |

(III) Results:
  (A) There was a slight indication of rendering as evidenced by the existence of several fat caps.
  (B) The product was stable but did contain several fat caps. However, the rendering was less than in Batch A.
  (C) The product was stable and there was no indication of any fat caps.

Example 6

Formula:

| | Grams |
|---|---|
| Pork cheeks | 6,810 |
| Head skin trimmings | 2,270 |
| Partially defatted pork fatty tissues | 3,405 |
| Pork stomach | 5,675 |
| Short plates | 2,270 |
| Mutton | 2,270 |
| Water (ice) | 5,360 |
| Seasoning and spices | 3,127 |

Two batches of the above noted formula were prepared:
(A) Comprised the control batch without oil, while
(B) Comprised the control batch plus an addition of 7.5% vegetable oil.

(I) Stability test:

(A) Water=7.40 ml. Fat=0.80 ml.
(B) Water=2.00 ml. Fat=0.20 ml.

(II) Analysis:

| | A, Percent | B, Percent |
|---|---|---|
| Moisture | 54.8 | 51.8 |
| Fat | 23.8 | 27.8 |
| Total protein | 13.9 | 12.9 |
| Meat protein | 12.6 | 11.6 |
| Added water | +4.4 | +5.4 |

(III) Results:

(A) The product was stable; had good color, peelability and texture; but had a few small fat caps which rendered the product objectionable.
(B) This product was very stable; had good color, peelability and texture; but had no fat caps or surface grease. The addition of the vegetable oil completely eliminated the fat cap characteristic.

The tests indicate that emulsions having soya oil incorporated therein showed a range from 0.80 ml. more to 5.40 ml. less water than emulsions without soya oil. The average accumulation of water for the soya oil containing emulsions was 1.5 ml. less than emulsions without the oil. For fat, the emulsions containing soya oil produced a range of fat from 0.02 ml. more to 0.60 ml. less than emulsions without soya oil—the average fat accumulation was lowered 0.28 ml. when soya oil was incorporated within the sausage composition.

It will be appreciated that the foregoing examples have been given for the purpose of clearness of understanding only, and that no unnecessary limitations are to be inferred therefrom.

As can clearly be seen from the foregoing description, the results of the present invention have shown that a stable sausage emulsion can be produced by the incorporation of the proper amount of a vegetable oil into a sausage composition. For the purposes of this invention, vegetable oil is interpreted to include all unsaturated fats other than those of animal origin. For example, olive oil, nut oil, soya oils, linseed oil, corn oil, tung oil, peanut oil, flaxseed oil, cottonseed oil, perilla oil, oiticica oil, etc.

It should also be appreciated that a wide variety of meat products may be used as the basis for the sausage. For example, beef products including flanks, loins, shanks, chucks, and various trimmings such as tongue trimmings, hearts and tripe, head skin trimmings, navel ends, cheek meat; and pork products including back bone trimmings, back fat trimmings, shoulder trimmings, head skin trimmings, belly trimmings, jowl trimmings, heart trimmings, cheek meat, head meat, tripe, snouts, navel ends, partially defatted chopped pork, etc.

Additionally, by the term "sausage" there are included such sausage compositions as frankfurters, bologna, domestic sausage, pork sausage, summer sausage, dry sausage, country-style sausage, etc.

Those skilled in the art will appreciate that various changes and modifications may be made in the present invention without departing from the spirit and scope thereof; and accordingly, they are intended to be included within the scope of the appended claims. It is, therefore, not the purpose to limit the patent granted on his invention otherwise than necessitated by the scope of the appended claims.

What is claimed is:

1. The method of preparing a stable sausage emulsion without the accumulation of surface grease caused by emulsion breakdown which consists of comminuting suitable sausage meats, mixing said comminuted meats with water, incorporating comminuted fat ingredients into the meat-water mixture, adding a vegetable oil in the proportion of 3% to 30% based upon the total weight of the meat material in the sausage emulsion and thereafter thoroughly mixing said resultant mixture to produce said stable sausage emulsion.

2. The method of claim 1, wherein the vegetable oil is soybean oil.

3. The method of claim 1, wherein the lean meats consist of pork cheeks, short plates and mutton and the fatty meats consist of head skin trimmings, partially defatted pork fatty tissue and pork stomach.

4. The method of preparing a stable sausage emulsion without the accumulation of surface grease caused by emulsion breakdown which consists of comminuting lean meats and comminuting fatty meats, chopping the comminuted lean meats in the presence of a quantity of ice thereby reducing the temperature thereof to 32° F., thereafter adding vegetable oil in the proportion of 3% to 30% based upon the total weight of the meat material in the sausage emulsion and the comminuted fatty meats to the comminuted lean meats, then continuing the chopping without additional chilling until the temperature is 45° F.

5. The method of preparing a stable sausage emulsion without the accumulation of surface grease caused by emulsion breakdown which consists of comminuting lean meats and comminuting fatty meats, chopping the comminuted lean meats in the presence of a quantity of ice thereby reducing the temperature thereof to 32° F., thereafter adding vegetable oil in the proportion of 3% to 30% based upon the total weight of the meat material in the sausage emulsion and the comminuted fatty meats to the comminuted lean meats, adding iso-ascorbate, then continuing the chopping without additional chilling until the temperature is 45° F.

6. The method of claim 5, wherein the vegetable oil is soybean oil.

References Cited by the Examiner

UNITED STATES PATENTS

| | | | |
|---|---|---|---|
| 2,634,212 | 4/1953 | Komarik | 99—109 X |
| 2,768,084 | 10/1956 | Griffith et al. | 99—157 X |
| 2,902,369 | 9/1959 | Komarik | 99—159 |
| 3,092,499 | 6/1963 | Gretler et al. | 99—108 X |
| 3,179,521 | 4/1965 | Poarch | 99—109 |

OTHER REFERENCES

Green et al.: "The Journal of The American Medical Association," January 5, 1963, vol. 183, No. 1, pp. 91, 92, and 93, article entitled Use of Fat-Modified Foods For Serum Cholesterol Reduction.

Rose et al.: "The Condensed Chemical Dictionary," 1956, published by Reinhold Publishing Corp., New York, p. 655, article entitled Linseed Oil.

A. LOUIS MONACELL, *Primary Examiner.*

HYMAN LORD, *Examiner.*